(12) United States Patent
Hu (10) Patent No.: US 12,086,637 B2
(45) Date of Patent: Sep. 10, 2024

(54) EFFICIENT STREAM COMPUTING USING REUSE AND AFFINITY

(71) Applicant: SAP SE, Walldorf (DE)

(72) Inventor: Dongqing Hu, Gao An (CN)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 17/471,309

(22) Filed: Sep. 10, 2021

(65) Prior Publication Data
US 2023/0099407 A1     Mar. 30, 2023

(51) Int. Cl.
*G06F 9/50*       (2006.01)

(52) U.S. Cl.
CPC .................. *G06F 9/5027* (2013.01)

(58) Field of Classification Search
CPC .................................... G06F 9/5027
See application file for complete search history.

(56) References Cited

U.S. PATENT DOCUMENTS

| | | |
|---|---|---|
| 10,817,285 B1 | 10/2020 | Hu |
| 10,846,083 B2 | 11/2020 | Hu |
| 2008/0147627 A1 | 6/2008 | Natkovish et al. |
| 2021/0129734 A1* | 5/2021 | Petty .................. B60R 9/00 |
| 2021/0182037 A1 | 6/2021 | Hu |
| 2021/0184990 A1 | 6/2021 | Hu |

* cited by examiner

*Primary Examiner* — Charlie Sun
(74) *Attorney, Agent, or Firm* — Fish & Richardson P.C.

(57) ABSTRACT

Methods, systems, and computer-readable storage media for receiving a first stream request, providing a first DAG representative of a data processing flow of the first stream request, comparing one or more DAGs representative of respective data processing flows of one or more running streams in a set of running streams to provide a set of comparison results, each running stream being processed by a computing machine of the stream computing system, and determining that the first stream request has a common portion with respect to a first running stream based on a first comparison result of the comparison results and, in response: providing the first stream request and the first comparison result to a computing machine that is processing the first running stream, the computing machine executing a stream merger that merges a non-common portion of the first stream request with the common portion within the first running stream.

20 Claims, 5 Drawing Sheets

EFFICIENT STREAM COMPUTING USING REUSE AND AFFINITY

BACKGROUND

Enterprises conduct operations using computer-executable applications and software systems that generate massive volumes of data (e.g., multiple terabytes (TB), petabytes (PB) or even larger volumes of data). Analyzing this data, or portions thereof, can enable enterprises to more efficiently conduct operations. Such data processing can be performed using batch computing or stream computing. In general, batch computing implies periodically processing of data in batches, while stream computing implies continuous processing of data. That is, each batch job executed in batch computing has an end (e.g., a result of the processed batch of data). In contrast, stream computing is continuous and endless. Stream computing is preferred in contexts such as big data, artificial intelligence (AI), and Internet-of-Things (IoT), as stream computing enables continuous processing of data as the data is received for real-time and/or near real-time analytics.

Data processing pipelines are implemented to enable preparation and processing of data for batch computing and/or stream computing. A data processing pipeline can be described as a series of processes that migrate data from a source system to a target system (e.g., a database system). A data processing pipeline can be optimized to avoid duplicate computing. Typically, however, multiple data processing pipelines are provided in parallel. While multiple data processing pipelines for batch computing are relatively straight-forward to optimize, multiple data processing pipelines for stream computing present challenges in optimization. For example, detecting and avoiding duplicate computing is difficult as non-obvious relationships between the multiple data processing pipelines can make stream computing non-performant, non-scalable, and uneconomic.

SUMMARY

Implementations of the present disclosure are directed to optimizing multiple data processing pipelines. More particularly, implementations of the present disclosure are directed to a scheduling system to enable optimization of multiple data processing pipelines in the stream computing context.

In some implementations, actions include receiving, by a scheduler of a stream computing system, a first stream request, providing, by the scheduler, a first directed acyclic graph (DAG) representative of a data processing flow of the first stream request, comparing, by the scheduler, one or more DAGs representative of respective data processing flows of one or more running streams in a set of running streams to provide a set of comparison results, each running stream being processed by a computing machine of the stream computing system, and determining, by the scheduler, that the first stream request has a common portion with respect to a first running stream based on a first comparison result of the comparison results and, in response: providing the first stream request and the first comparison result to a computing machine that is processing the first running stream, the computing machine executing a stream merger that merges a non-common portion of the first stream request with the common portion within the first running stream. Other implementations of this aspect include corresponding systems, apparatus, and computer programs, configured to perform the actions of the methods, encoded on computer storage devices.

These and other implementations can each optionally include one or more of the following features: the scheduler includes a stream registry that provides the one or more DAGs representative of respective data processing flows of the one or more running streams in the set of running streams; comparing at least partially includes executing code analysis to identify any differences between one or more functions of the stream request and one or more functions of each of the running streams; comparing at least partially includes comparing node identifiers of nodes of the DAG of the stream request with node identifiers of nodes of the DAG of each running stream; actions further include determining that a computing machine executing the first running stream is unavailable to process the stream request and, in response, identifying the first computing device as available to process the stream request and the first running stream, and providing the first running stream to the first computing device for processing; actions further include receiving, by the scheduler, a second stream request, and determining, by the scheduler, that the second stream request is identical to a second running stream based on a second comparison result and, in response, discarding the second stream request; actions further include receiving, by the scheduler, a second stream request, and determining, by the scheduler, that the second stream request is absent a common portion with respect to any of the running streams in the set of running streams and, in response, providing the stream request to a computing machine for processing.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to optimizing multiple data processing pipelines. More particularly, implementations of the present disclosure are directed to a scheduling system to enable optimization of multiple data processing pipelines in the stream computing context. Implementations can include actions of receiving, by a scheduler of a stream computing system, a first stream request, providing, by the scheduler, a first directed acyclic graph (DAG) representative of a data processing flow of the first stream request, comparing, by the scheduler, one or more DAGs representative of respective data processing flows of one or more running streams in a set of running streams to provide a set of comparison results, each running stream being processed by a computing machine of the stream computing system, and determining, by the scheduler, that the first stream request has a common portion with respect to a first running stream based on a first comparison result of the comparison results and, in response: providing the first stream request and the first comparison result to a computing machine that is processing the first running stream, the computing machine executing a stream merger that merges a non-common portion of the first stream request with the common portion within the first running stream.

To provide further context for implementations of the present disclosure, and as introduced above, enterprises conduct operations using computer-executable applications and software systems that generate massive volumes of data (e.g., multiple terabytes (TB), petabytes (PB) or even larger volumes of data). Analyzing this data, or portions thereof, can enable enterprises to more efficiently conduct operations. Such data processing can be performed using batch computing or stream computing. In general, batch computing implies periodically processing of data in batches, while stream computing implies continuous processing of data. That is, each batch job executed in batch computing has an end (e.g., a result of the processed batch of data). In contrast, stream computing is continuous and endless. Stream computing is preferred in contexts such as big data, artificial intelligence (AI), and Internet-of-Things (IoT), as stream computing enables continuous processing of data as the data is received for real-time and/or near real-time analytics.

Data processing pipelines are implemented to enable preparation and processing of data for batch computing and/or stream computing. A data processing pipeline can be described as a series of processes that migrate data from a source system to a target system (e.g., a database system). A data processing pipeline can be optimized to avoid duplicate computing. Typically, however, multiple data processing pipelines are provided in parallel. While optimization is desired for stream computing, multiple data processing pipelines for stream computing present challenges in optimization. For example, detecting and avoiding duplicate computing is difficult as non-obvious relationships between the multiple data processing pipelines can make stream computing non-performant, non-scalable, and uneconomic.

In view of the above context, implementations of the present disclosure provide a scheduling system to enable optimization of multiple data processing pipelines in the stream computing context. As described in further detail herein, the scheduling system of the present disclosure compares data processing streams, also referred to herein as streams. In some examples, a stream includes data from a source system that is to be processed through a data processing pipeline to provide one or more results that can be provided to a target system. If a first stream is running, and a second stream with identical structure is requested, a scheduler can reuse the first stream and discard the second stream. If the second stream is not identical, but has portions in common with the first stream, the scheduler determines common portions of the first stream and the second stream and reuses the common portion from the first stream. In some examples, and in the case of multiple computing machines, the scheduler deploys the second stream to the same machine that the first stream is running on to reuse at least a portion of the first stream for processing of the second stream. Among other technical improvements, the scheduling system of the present disclosure identifies and eliminates duplicate processing of data thereby improving performance, scalability, and cost in stream computing.

Implementations of the present disclosure are described in further detail herein with reference to, among other example entities, example distributed processing systems, an example scheduler, and an example cluster manager. The example distributed processing systems are Apache Spark and Apache Flink, which can each be described as an open source, Java-based, software framework and parallel data processing engine that enables processing tasks to be broken down and executed in parallel, the tasks being distributed across a cluster (Spark/Flink cluster). A cluster can be described as a collection of nodes (computing machines) that are networked together to perform parallel computations on data sets. The example scheduler is Apache Aurora and the example cluster manager is Apache Mesos. Apache Aurora can be described as a service scheduler that runs on top of Apache Mesos and is the primary interface for data processing within a cluster. Apache Aurora runs and manages jobs in Apache Mesos. Apache Mesos can be described as a resource-sharing platform that manages computing clusters.

It is contemplated, however, that implementations of the present disclosure can be realized with any appropriate entities, such as any appropriate distributed processing system, scheduler, and/or cluster manager. More specifically, references to Apache Spark, Flink, Mesos, and Aurora are merely illustrative of a processing systems and components, upon which implementations of the present disclosure may be practiced. It is contemplated that specific code, such as the code descriptions discussed by way of example inf the instant application, could be executed within any appropriate distributed processing systems, schedulers, and/or cluster managers to improve stream computing performance.

Figure 1:
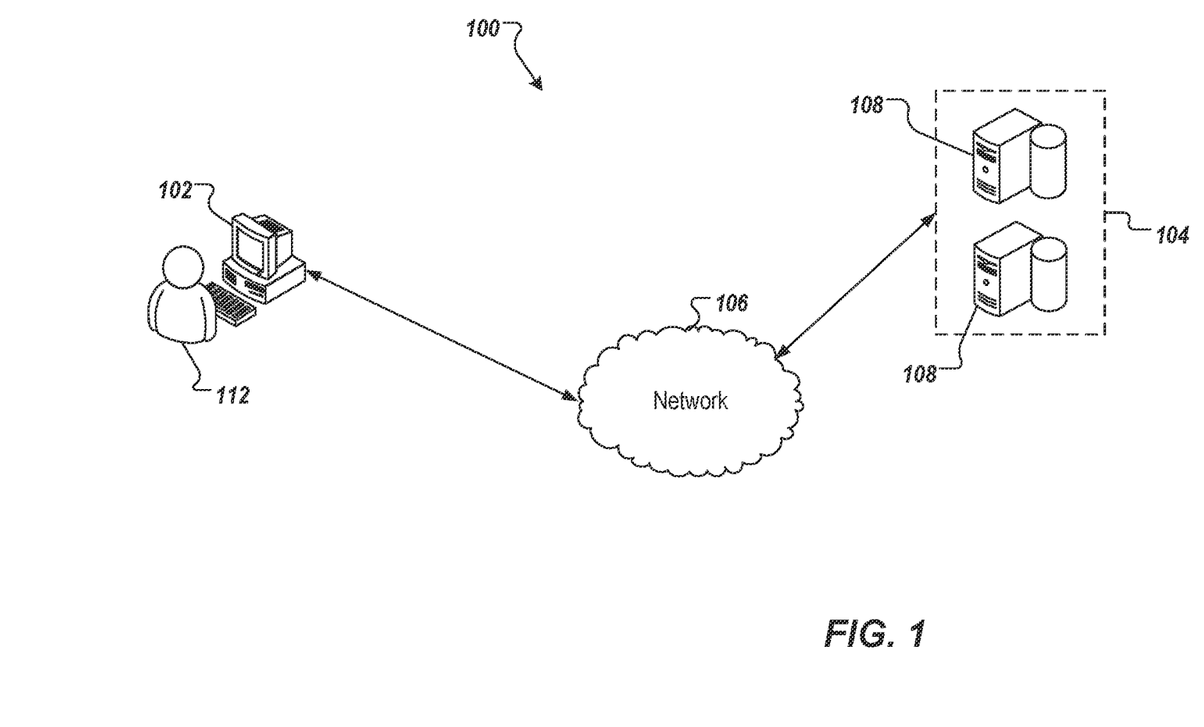
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a stream computing system that is deployed using a distributed processing system, such as Apache Spark/Flink introduced above. The stream computing system includes the scheduling system of the present disclosure, which enables optimization of multiple data processing pipelines in the stream computing context. The scheduling system of the present disclosure compares data processing streams, also referred to herein as streams, for selective reuse of at least a portion of running streams.

Figure 2:
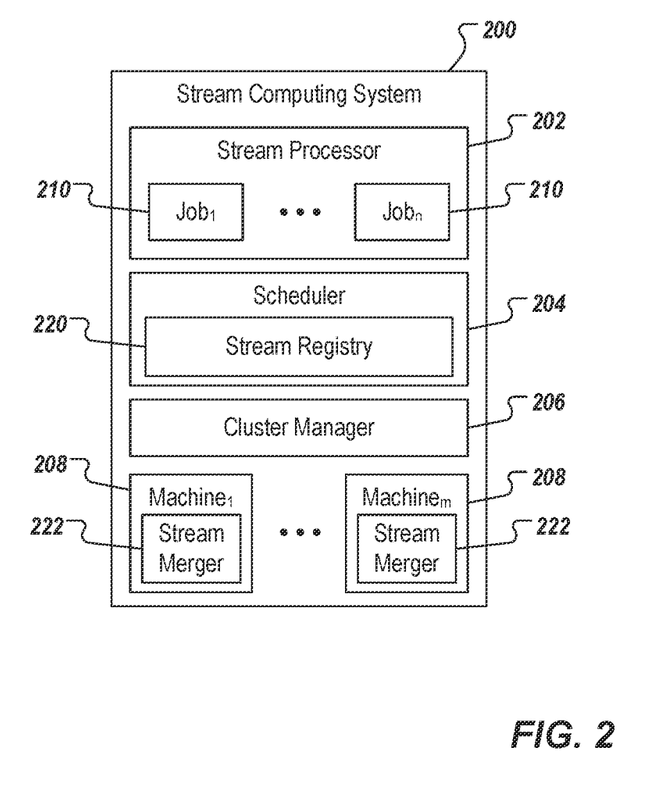
FIG. 2 depicts an example stream computing system in accordance with implementations of the present disclosure.

FIG. 2 depicts an example stream computing system 200 in accordance with implementations of the present disclosure. In some examples, the example stream computing system 200 is provided in a distributed processing system (e.g., Apache Spark/Flink). In the example of FIG. 2, the example stream computing system 200 includes a stream processor 202, a scheduler 204 (e.g., Apache Aurora), a cluster manager 206 (e.g., Apache Mesos), and computing machines 208 (also referred to as cluster nodes). In some examples, the stream processor 202 runs jobs 210 on the scheduler 204. The computing machines 208 execute scheduled tasks and are managed by the cluster manager 206. In some examples, the stream computing system 200 receives stream requests from source systems and processes each stream request to provide a result to a target system. In some examples, the scheduler 204 identifies a computing machine 208 that is to handle each stream request and dispatches the stream request for handling by the computing machine that is selected 208.

In accordance with implementations of the present disclosure, a scheduling system is provided within the example stream computing system 200 and includes a stream registry 220 and stream mergers 222. As depicted in the example of FIG. 2, the stream registry 220 is provided in the scheduler 204 and a stream merger 222 is provided in each of the computing machines 208. In some implementations, the stream registry 220 tracks each stream request that is received and that is dispatched to a computing machine 208 for processing. In some examples, for each stream request that is received, the stream registry stores metadata representative of the stream request. Example metadata can include, but is not limited to, a DAG that models a respective stream request and code of the respective stream request. In some examples, a DAG includes nodes and edges between nodes, each node representing a data transformation (e.g., function) that is executed for the stream request and each edge represent transfer of data between data transformations. In mathematical terms, a DAG is a graph modeled as G (V, E) with a set of nodes $V=\{v_1, \ldots, v_n\}$ and a set of edges $E=\{e_1, \ldots, e_m\}$ connecting nodes, where $|V|=n$ and $|E|=m$. In some examples, each node represents a data transformation task and is associated with metadata that indicates the data transformations task represented by the respective node. Computer-executable code is also provided, which defines the data transformation tasks. In some examples, each edge is associated with metadata that indicates the nodes connected by the edge and the direction of flow (e.g., a source node that provides output to a sink node). For example, an edge can connect a first node and a second node. The first node represents code that can be executed to provide data. The edge represents that the data output from the first node is input to the second node. In some examples, the second node represents code that can be executed to process the data and provide data (e.g., new data that is generated based on the data received from the first node).

In some implementations, when a stream request ($stream_{req}$) is submitted to the scheduler 204, the scheduler 204 calls the stream registry 220 to compare the stream request with existing, currently running streams ($stream_{run}$) to provide a comparison result. In some examples, the stream request includes computer-executable code for processing data and a data source descriptor provided as metadata that indicates how to connect to and read from a specified data source.

In some examples, a set of running streams can be identified in an index stored within the stream registry, each running stream in the set of running streams being executed by a computing machine 208. That is, for example, for each running stream, an index entry is provided that includes a unique identifier assigned to the running stream (e.g., $stream_{runX}$) and a machine identifier (e.g., $CM_X$) that uniquely identifies the computing machine 208 that is processing the running stream. The following example indexes can be considered:

| Running Stream | Computing Machine |
| --- | --- |
| $stream_{run1}$ | $CM_1$ |
| $stream_{run2}$ | $CM_2$ |
| $stream_{run3}$ | $CM_2$ |

Example Index

The example index represents a scenario, in which there are multiple running streams, a first running stream ($stream_{run1}$) running one a first computing machine ($CM_1$), and both a second running stream ($stream_{run2}$) and a third running stream ($stream_{run3}$) being processed by a second computing machine ($CM_2$).

For each running stream in the set of running streams, the computing machine 208 processing the running stream is identified in the index (e.g., by the machine identifier that uniquely identifies the computing machine 208 amongst all of the computing machines 208). In some examples, the stream registry 220 provides a comparison result for each of the stream request and running stream pairs. For example, a stream request ($stream_{req}$, which uniquely identifies the stream request) can be received and the first running stream ($stream_{run1}$), the second running stream ($stream_{run2}$), and the third running stream ($stream_{run3}$) are identified in the index. While three running streams are referenced for purposes of illustration, it is appreciated that the index can identify any appropriate number of running streams. A DAG of the stream request ($DAG_{req}$) is determined and is compared to each of a DAG of the first running stream ($DAG_{run1}$), a DAG of the second running stream ($DAG_{run2}$), and a DAG of the third running stream ($DAG_{run3}$) to provide a first comparison result (result), a second comparison result (result$_2$), and a third comparison result (result$_3$), respectively.

In some examples, a DAG is generated by virtual execution of the computer-executable code of the stream to interpret the computer-executable code to a computing graph. Virtual execution does not process data or even retrieve data from the specified data source. In some examples, the data processing system (e.g., Apache Spark/Flink) provides functionality to generate DAGs.

In generating a DAG, the following example computer-executable code can be considered for purposes of non-limiting example:

stream=data.map (i→i+i)
       .filter (i→i<1)
       .filter (i→i<100)
       .collect( )

In this example, a root node of a resulting DAG is data, which is a data source descriptor, but not the real data set. Execution of map is not real computing, but only creates a child node map of the root node data. Execution of filter creates a child node filter of the node map, and so on. The return value of the series of function calls tailed with a collect call is the DAG object. The return value is assigned to the stream variable, such that stream holds the reference to the DAG object. The resulting DAG can be visualized as:

data→map→filter→filter→collect

In generating a DAG, another example computer-executable code can be considered for purposes of non-limiting example:

stream1=data1.map (i→i+i)
    stream2=data2.filter (i→i>0)
       .map (i→i^2)
    stream3=join (stream1, stream2).byIndex( )
       .collect( )

Figure 3A:
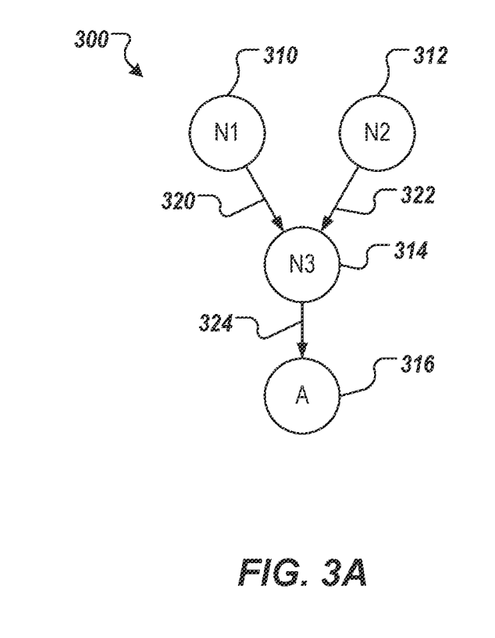
FIGS. 3A-3C depict an example of merging of directed acyclic graphs (DAGs) in accordance with implementations of the present disclosure.
Figure 3B:
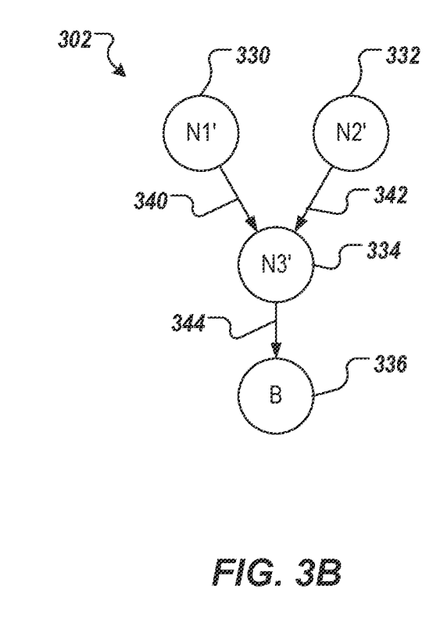

In this example, the variables stream1 and stream2 each holds a reference to a chain-like DAG object. A join call is made to converge the two streams into stream3. The resulting DAG is a convergence of streams and can be visualized as:

Implementations for determining a comparison result are described herein with reference to the examples of FIGS. 3A and 3B. FIG. 3A depicts a first DAG 300 and FIG. 3B depicts a second DAG 302. It is appreciated that the first DAG 300 and the second DAG 302 are relatively simple for purposes of illustration and that implementations of the present disclosure can be realized with more complex DAGs. In some examples, the first DAG 300 is representative of a running stream and the second DAG 302 is representative of a stream request. In the example of FIG. 3A, the first DAG 300 includes nodes 310, 312, 314, 316 and edges 320, 322, 324. In the example of FIG. 3B, the second DAG 302 includes nodes 330, 332, 334, 336 and edges 340, 342, 344.

In some implementations, in comparing DAGs, an ancestor path of a node N, written as p(N) is determined as a series of its ancestor nodes starting from the root node. In the example of FIG. 3A, for the node 316, p(A) is determined to be the nodes 310, 312 to the node 314, which can be notated as p(A): (N1, N2)→N3. In the example of FIG. 3B, for the node 336, p(B) is determined to be the nodes 330, 332 to the node 334, which can be notated as p(B): (N1', N2')→N3'.

Nodes along the respective paths are compared and respective paths are compared. In some examples, nodes are determined to be equal, if they do the same computing on the same data source. Further, if the node 310 and the node 330 are equal (i.e., N1=N1') and if the node 312 and the node 332 are equal (i.e., N2=N2'), then the node 314 (N3) and the node 334 (N3') are determined to have the same ancestor path. If the node 314 (N3) and the node 334 (N3') are equal (i.e., N3=N3'), the node 316 and the node 336 are determined to have the same ancestor path. If the node 316 and the node 336 do the same computing on the same data source, it is determined that the node 316 and the node 336 are equal (i.e., A=B). If no nodes are the same, the DAGs are determined to be wholly different. If the nodes and ancestor paths are the same, the DAGs are determined to be identical. If only some of the nodes and ancestor paths are the same, the DAGs are determined to have common ancestor portions. In the examples of FIGS. 3A and 3B, it can be determined that the node 316 and the node 336 are not equal (i.e., A=B). Consequently, it is determined that the DAG 300 and the DAG 302 are not identical, but do have portions in common.

In some implementations, to compare nodes, the root node has data source information and child nodes are transformations of the original data source. In this manner, the data source identity can be examined at the root nodes of respective DAGs to determine whether the data source is the same. In some examples, one or more techniques can be implemented to determine whether nodes do the same computing.

In one example technique, a node identifier ($ID_{node}$) can be assigned to each node to uniquely identify the data transformation represented by nodes. In some examples, node identifiers are automatically assigned by a development environment during compiling of the code. If multiple streams are defined in one program and the program author intentionally reuses the code of common nodes, the occurrences of a common node will always have the same $ID_{node}$. Accordingly, if a node in a DAG has the same $ID_{node}$ as a node in another DAG, the nodes are determined to represent the same computing.

Another example technique includes performing code analysis on the code corresponding to each of the nodes. In some examples, the code analysis identifies whether code reveals the same code or the same semantics. For example, the following user-defined functions can be considered:

```
function f1(data) {
    a = data.map(i->i+i)
        .filter(i->i<1)
        .filter(i->i<100)
        .collect( )
```

```
    emit(a)
}
```

Example Function f1

```
function f2(data) {
    b = data.map(i->i*2)
        .filter(i->i<100)
        .filter(i->i>1)
        .collect( )
    emit(b)
}
```

Example Function f2

In the above examples, differences are bolded. While differences are present, code analysis can identify that the functions have the same semantics.

In some implementations, code analysis includes receiving two code segments, parsing each code segment into an abstract syntax tree (AST) and normalizing ASTs to a dedicated form based on one or more normalization rules to provide normalized ASTs. In the context of the present disclosure, a first code segment is provided from a node of a first DAG and a second code segment is provided from a node of a second DAG that is being compared to the first DAG. In some examples, predetermined normalization rules are applied to the ASTs, and each normalization rule corresponds to a different/particular node of the ASTs. Each normalization rule is assigned a unique identifier, which are used to compare nodes of ASTs. The normalized ASTs are compared to determine whether they match. In some examples, comparison can be performed using a text-based approach or a tree-based approach. The text-based approach converts both ASTs to text-format code segments using the same code style (e.g., indentation). The tree-based approach traverses each AST at the same or different times. For nodes at the same position in their respective AST, the tree-based approach compares based on whether they have the same lexical or syntactical attributes (e.g., symbols or literal values). In the process, the tree-based can ignore unrelated attributes (e.g., code length, code start position). Example code analysis is described in further detail in commonly assigned U.S. application Ser. No. 16/714,007, filed on Dec. 13, 2019 and entitled Similar Code Analysis and Template Induction, which is expressly incorporated herein by reference in the entirety for all purposes.

Referring again to FIG. 2, if the first comparison results indicate that the stream request is identical to either the first running stream or the second running stream (e.g., DAGs are identical), the stream request is discarded. That is, the stream request is not sent to a computing machine 208 for processing, because an identical stream is already running. If the first comparison results indicate that the stream request has no portions in common with either the first running stream or the second running stream (e.g., DAGs are not sufficiently similar), the stream request is dispatched to a computing machine 208 for processing. In some examples, the computing machine 208 is selected (e.g., by the scheduler 204) based on load balancing and/or computing machines 208 having sufficient resources available to process the stream request.

If the comparison results indicate that the stream request has portions in common with a running stream (e.g., the first running stream, the second running stream, or the third running stream), the scheduler 204 sends the stream request and the comparison result (e.g., the stream request indicating the running stream by its unique identifier ($stream_{runX}$) and the common portion) to the computing machine 208 that is processing the running stream (e.g., the computing machine 208 being identified in the index of the stream registry). The stream merger 222 of the computing machine 208 merges the non-common portion of the stream request into the common portion of the running stream. In some examples, the computing machine 208 can include multiple threads, for example, each thread processing a running stream. The computing machine 208 can maintain an index of threads and running streams and can identify a thread that is to execute the merged stream based on the running stream indicated in the comparison result.

Figure 3C:
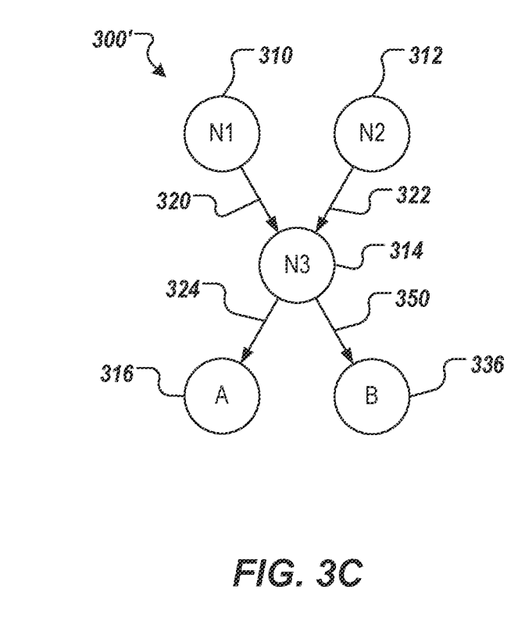

FIGS. 3A-3C depict an example of merging of DAGs 300, 302 in accordance with implementations of the present disclosure. For example, and as discussed herein, it can be determined that the node 316 and the node 336 are not the same (i.e., A≠B), but that the node 316 and the node 336 have an ancestor path in common (i.e., p(A)=p(B); N1=N1', N2=N2', N3=N3'). Consequently, the node 336 can be merged into the DAG 300 to provide the DAG 300' of FIG. 3C. More particularly, the non-common portion of the stream request, the node 336 in this example, is connected to the last node in the ancestor path that is common, (N1, N2)→N3 in this example. That is, the node 336 is merged into the DAG 300 and an edge 350 is added to connect the node 314 and the node 336.

As described herein, the scheduler 204 deploys the request stream to the same computing machine 208 that the running stream is running on to reuse at least a portion of the running stream for processing of the request stream. In some instances, however, it can occur that the computing device 208 has insufficient resources to handle the processing. For example, the computing device 208 can be in a state (e.g., overload state) that prevents the computing device 208 from handling additional streams. In such instances, deployment of the stream request can be managed by the scheduler 204 using self-adaptive operators. For example, the scheduler 204 is in communication with each of the computing machines 208 and receives resource utilization data from each. In some examples, before deploying the request stream to the same computing machine 208 that the running stream is running on, the scheduler 204 can determine whether the resource utilization of the computing machine 208 exceeds a predetermined threshold. If the resource utilization of the computing machine 208 does not exceed the predetermined threshold, the stream request and comparison result are deployed to the computing machine 208. If the resource utilization of the computing machine 208 exceeds the predetermined threshold, the scheduler 204 sends a message to an operator manager of the computing machine 208, and in response, the operator manager can move processing of the running stream to another computing machine 208. In this manner, data processing can be dynamically distributed. In some examples, the message includes an identifier of the computing machine 208 that is in the overload state (e.g., from-machine) and an identifier of an available computing machine 208 (e.g., to-machine). Example self-adaptive operators and use thereof are described in further detail in commonly assigned U.S. application Ser. No. 16/714,043, filed on Dec. 13, 2019 and entitled Cost-Effective and Self-Adaptive Operators for Distributed Data Processing, which is expressly incorporated herein by reference in the entirety for all purposes.

Figure 4:
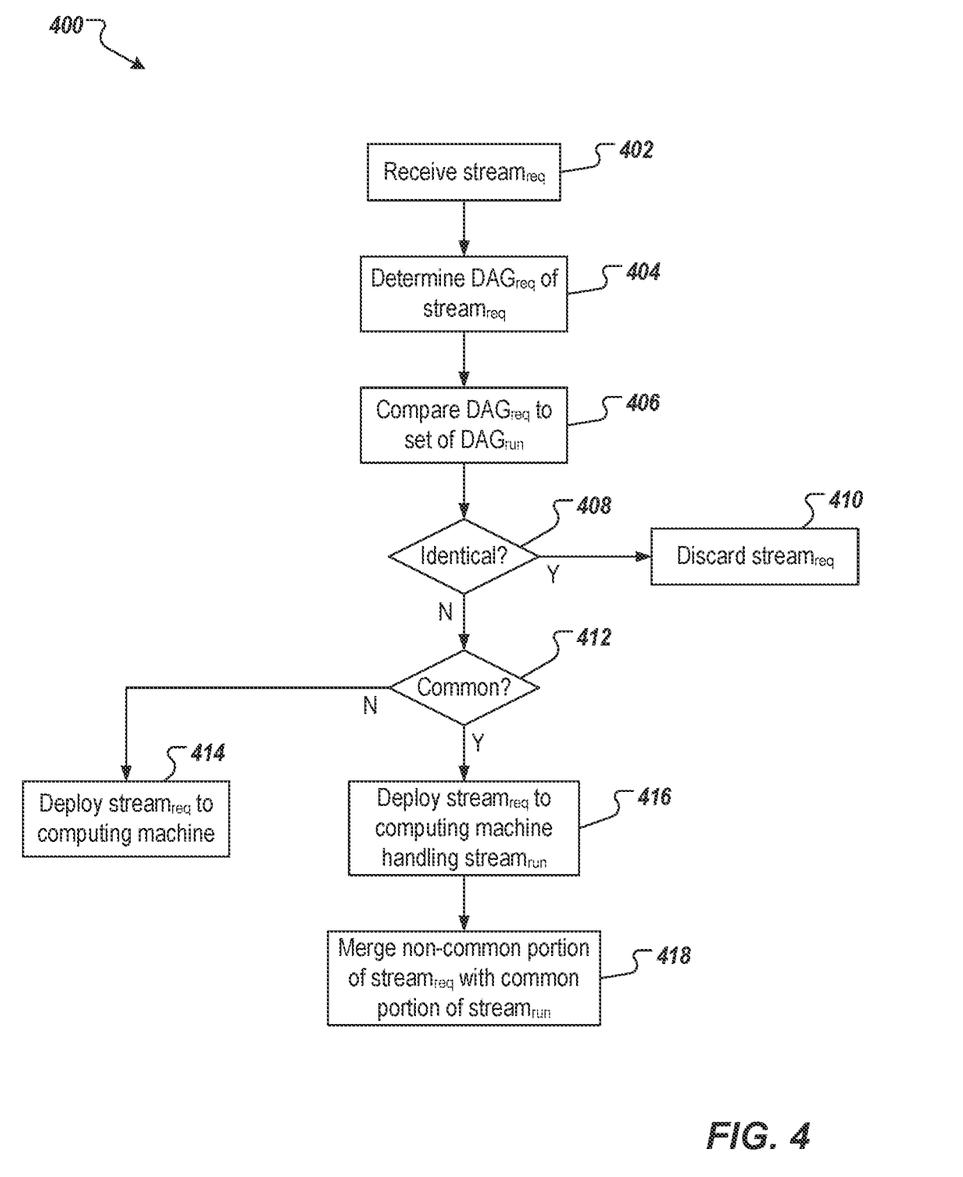
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A stream request (stream$_{req}$) is received (402). For example, and as described herein, the scheduler 204 of FIG. 2 can receive a stream request from a source system. In some examples, the stream request includes a data descriptor for data that is to be processed and computer-executable code. A DAG of the stream request (DAG$_{req}$) is determined (404). For example, and as described herein, the scheduler 204 processes the stream to provide the DAG$_{req}$. The DAG$_{req}$ is compared to one or more DAGs of running streams (DAG$_{run}$) in a set of DAG$_{runS}$ (406). For example, and as described herein, for each running stream, a DAG is provided from an index maintained by the scheduler 204. The scheduler 204 processes each DAG$_{req}$ and DAG$_{run}$ pair to provide a respective comparison result. In some examples, the comparison includes identifying equivalent nodes and ancestor paths, if any. In some examples, each comparison result indicates whether the DAG$_{req}$ and a respective DAG$_{run}$ are dissimilar, are identical, or are different, but have at least a portion in common.

It is determined whether DAG$_{req}$ is identical to a DAG$_{run}$ in the set of DAG$_{runS}$ (408). For example, and as described herein, the comparison results are reviewed to determine whether the DAG$_{req}$ and any DAG$_{run}$ are identical. If DAG$_{req}$ is identical to a DAG$_{run}$, the stream request is discarded (410). For example, and as described herein, if DAG$_{req}$ is identical to a DAG$_{run}$, the stream request is identical to a running stream and is therefore, redundant and can be discarded. If DAG$_{req}$ is not identical to a DAG$_{run}$, it is determined whether DAG$_{req}$ has a common portion with a DAG$_{run}$ (412). For example, and as described herein, the comparison results are reviewed to determine whether the DAG$_{req}$ and any DAG$_{run}$ have at least a portion in common (e.g., nodes having common ancestor paths). If DAG$_{req}$ does not have a common portion with a DAG$_{run}$, the stream request is deployed to a computing machine for processing (414). For example, and as described herein, if DAG$_{req}$ does not have a common portion with a DAG$_{run}$, the stream request is unique to the running streams, such that reuse of portions of a running stream is not available. Consequently, the stream request itself is processed.

If DAG$_{req}$ does have a common portion with a DAG$_{run}$, the stream request and comparison result are deployed to the computing machine handling the running stream (416). For example, and as described herein, if DAG$_{req}$ does have a common portion with a DAG$_{run}$, the common portion can be used for processing the non-common portion of the stream request. In some examples, the computing machine 208 handling the running stream corresponding to the DAG$_{run}$ is determined from the index. In some examples, and as described herein, if the computing machine 208 handling the running stream corresponding to the DAG$_{run}$ is unable to handle the stream request (e.g., is in an overload state), deployment of the stream request can be managed by the scheduler 204 using self-adaptive operators. For example, another computing machine 208 can be determined and the running stream and stream request transmitted there for processing. The non-common portion of the stream request is merged with the common portion of the running stream (418). For example, and as described herein, the stream merger 222 of the computing machine 208 merges the non-common portion of the stream request with the last node along the common ancestor path within the running stream.

Figure 5:
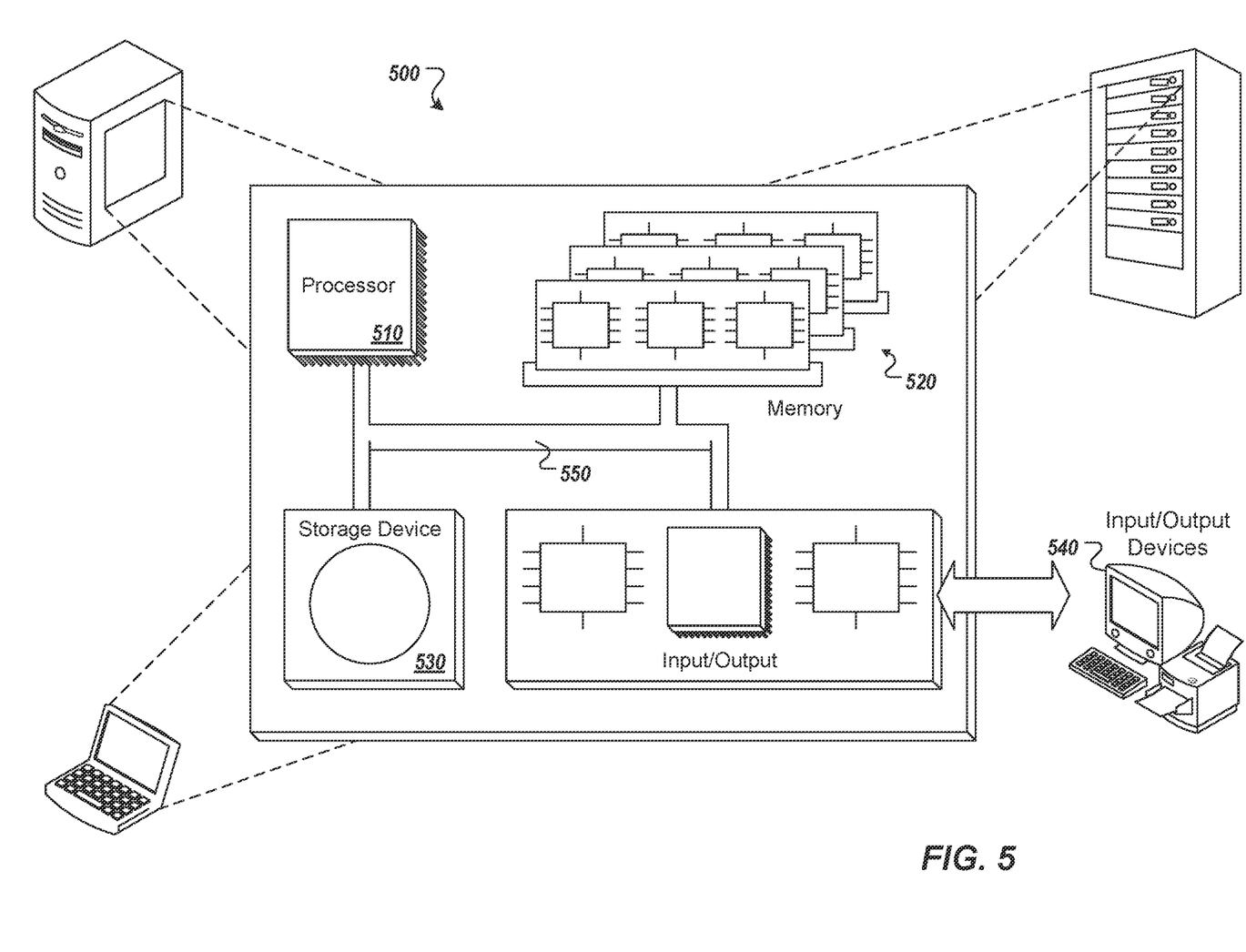
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selective reuse of running streams in distributed data processing systems having multiple data processing pipelines, the method being executed by one or more processors and comprising:
   receiving, by a scheduler of a stream computing system, a first stream request;
   providing, by the scheduler, a first directed acyclic graph (DAG) representative of a data processing flow of the first stream request;
   comparing, by the scheduler, one or more DAGs representative of respective data processing flows of one or more running streams in a set of running streams to provide a set of comparison results, each running stream being processed by a respective computing machine of the stream computing system; and
   determining, by the scheduler, that a first portion of the first stream request is in common with a first portion of a first running stream based on a first comparison result of the comparison results and, in response:
      providing the first stream request and the first comparison result to a first computing machine for processing with the first running stream, and
      merging, by the first computing machine, a second portion of the first stream request that is non-common with portions within the first running stream for reuse of the first portion of the first running stream and execution of the second portion of the first stream request within the first running stream for the first stream request.

2. The method of claim 1, wherein the scheduler comprises a stream registry that provides the one or more DAGs representative of respective data processing flows of the one or more running streams in the set of running streams.

3. The method of claim 1, wherein comparing at least partially comprises executing code analysis to identify any differences between one or more functions of the stream request and one or more functions of each of the running streams.

4. The method of claim 1, wherein comparing at least partially comprises comparing node identifiers of nodes of the DAG of the stream request with node identifiers of nodes of the DAG of each running stream.

5. The method of claim 1, further comprising determining that a computing machine executing the first running stream is unavailable to process the first stream request and, in response:
   identifying the first computing machine as available to process the stream request and the first running stream; and
   providing the first running stream to the first computing machine for processing.

6. The method of claim 1, further comprising:
   receiving, by the scheduler, a second stream request; and
   determining, by the scheduler, that the second stream request is identical to a second running stream based on a second comparison result and, in response, discarding the second stream request.

7. The method of claim 1, further comprising:
   receiving, by the scheduler, a second stream request; and
   determining, by the scheduler, that the second stream request is absent a common portion with respect to any of the running streams in the set of running streams and, in response, providing the stream request to a computing machine for processing.

8. A non-transitory computer-readable storage medium coupled to one or more processors and having instructions stored thereon which, when executed by the one or more processors, cause the one or more processors to perform operations for selective reuse of running streams in distributed data processing systems having multiple data processing pipelines, the operations comprising:
   receiving, by a scheduler of a stream computing system, a first stream request;
   providing, by the scheduler, a first directed acyclic graph (DAG) representative of a data processing flow of the first stream request;
   comparing, by the scheduler, one or more DAGs representative of respective data processing flows of one or more running streams in a set of running streams to provide a set of comparison results, each running stream being processed by a respective computing machine of the stream computing system; and determining, by the scheduler, that a first portion of the first stream request is in common with a first portion of a first running stream based on a first comparison result of the comparison results and, in response:
  providing the first stream request and the first comparison result to a first computing machine for processing with the first running stream, and
  merging, by the first computing machine, a second portion of the first stream request that is non-common with portions within the first running stream for reuse of the first portion of the first running stream and execution of the second portion of the first stream request within the first running stream for the first stream request.

9. The non-transitory computer-readable storage medium of claim 8, wherein the scheduler comprises a stream registry that provides the one or more DAGs representative of respective data processing flows of the one or more running streams in the set of running streams.

10. The non-transitory computer-readable storage medium of claim 8, wherein comparing at least partially comprises executing code analysis to identify any differences between one or more functions of the stream request and one or more functions of each of the running streams.

11. The non-transitory computer-readable storage medium of claim 8, wherein comparing at least partially comprises comparing node identifiers of nodes of the DAG of the stream request with node identifiers of nodes of the DAG of each running stream.

12. The non-transitory computer-readable storage medium of claim 8, wherein operations further comprise determining that a computing machine executing the first running stream is unavailable to process the first stream request and, in response:
  identifying the first computing machine as available to process the stream request and the first running stream; and
  providing the first running stream to the first computing machine for processing.

13. The non-transitory computer-readable storage medium of claim 8, wherein operations further comprise:
  receiving, by the scheduler, a second stream request; and
  determining, by the scheduler, that the second stream request is identical to a second running stream based on a second comparison result and, in response, discarding the second stream request.

14. The non-transitory computer-readable storage medium of claim 8, wherein operations further comprise:
  receiving, by the scheduler, a second stream request; and
  determining, by the scheduler, that the second stream request is absent a common portion with respect to any of the running streams in the set of running streams and, in response, providing the stream request to a computing machine for processing.

15. A system, comprising:
  one or more processors; and
  a non-transitory computer-readable storage device coupled to the one or more processors and having instructions stored thereon which, when executed by the one or more processors, cause the one or more processors to perform operations for selective reuse of running streams in distributed data processing systems having multiple data processing pipelines, the operations comprising:
    receiving, by a scheduler of a stream computing system, a first stream request;
    providing, by the scheduler, a first directed acyclic graph (DAG) representative of a data processing flow of the first stream request;
    comparing, by the scheduler, one or more DAGs representative of respective data processing flows of one or more running streams in a set of running streams to provide a set of comparison results, each running stream being processed by a respective computing machine of the stream computing system; and
    determining, by the scheduler, that a first portion of the first stream request is in common with a first portion of a first running stream based on a first comparison result of the comparison results and, in response:
      providing the first stream request and the first comparison result to a first computing machine for processing with the first running stream, and
      merging, by the first computing machine, a second portion of the first stream request that is non-common with portions within the first running stream for reuse of the first portion of the first running stream and execution of the second portion of the first stream request within the first running stream for the first stream request.

16. The system of claim 15, wherein the scheduler comprises a stream registry that provides the one or more DAGs representative of respective data processing flows of the one or more running streams in the set of running streams.

17. The system of claim 15, wherein comparing at least partially comprises executing code analysis to identify any differences between one or more functions of the stream request and one or more functions of each of the running streams.

18. The system of claim 15, wherein comparing at least partially comprises comparing node identifiers of nodes of the DAG of the stream request with node identifiers of nodes of the DAG of each running stream.

19. The system of claim 15, wherein operations further comprise determining that a computing machine executing the first running stream is unavailable to process the first stream request and, in response:
  identifying the first computing machine as available to process the stream request and the first running stream; and
  providing the first running stream to the first computing machine for processing.

20. The system of claim 15, wherein operations further comprise:
  receiving, by the scheduler, a second stream request; and
  determining, by the scheduler, that the second stream request is identical to a second running stream based on a second comparison result and, in response, discarding the second stream request.

* * * * *